Patented Oct. 6, 1931

1,825,801

UNITED STATES PATENT OFFICE

JESSE G. KING AND HARRY B. HULL, OF DAYTON, OHIO, ASSIGNORS, BY MESNE ASSIGNMENTS, TO GENERAL MOTORS RESEARCH CORPORATION, OF DAYTON, OHIO, A CORPORATION OF DELAWARE

REFRIGERATING APPARATUS

Application filed May 7, 1923. Serial No. 637,136.

This invention relates to refrigerating apparatus, and particularly to the type of apparatus for household use in which the mechanism may be enclosed within a cabinet which includes the food compartment. However, the invention is not necessarily limited to household refrigerators but is susceptible of general application.

It is among the objects of the present invention to reduce the temperature of a compartment in a more efficient manner than heretofore and by means of mechanism which is simple in construction and can easily be maintained in operable condition.

In carrying out these objects the invention provides a unitary structure including a refrigerant compressor, a condenser for the fluid, air-cooling means for reducing the temperature of the condenser, and a common electric motor for operating the pump and the air cooling means.

Further objects of the invention are to increase the transfer of heat from the condenser to the air-cooling means so that the refrigerant fluid may be condensed more efficiently and with the use of less power by the motor.

It is desirable to provide a refrigerator which can be placed in any corner of a room and it is also desirable for manufacturing reasons and for maintaining symmetry, to provide a rectangular shaped cabinet for enclosing the entire refrigerating mechanism. One of the problems present in this type of construction is to provide for the free circulation of cooling air for the air cooled condenser when the refrigerator is placed in any corner. A further object of the present invention is to insure the free circulation of cooling air for the air cooled condenser at all times regardless of where the refrigerator is installed.

Further objects and advantages of the present invention will be apparent from the following description, reference being had to the accompanying drawings, wherein a preferred embodiment of one form of the present invention is clearly shown.

Referring to the drawings, the refrigerator cabinet 20 includes preferably a wood exterior wall 21 supporting shelves 22 and 23. The food compartment 24 is lined with enameled metal 25 which is insulated from the walls of the cabinet and the shelf 23 by cork 37 or the like. One corner of the compartment 24 is divided off by a double wall partition 26 to provide a cooling chamber 27. Partition 26 is provided with openings 28 and 29 for the circulation of air.

An expansion tank 30 is suspended within the chamber 27 by a strap 31 and is connected with both ends of a coil 32 for containing the refrigerant fluid. Said tank 30 and coil 32 provide a cooling unit for cooling chamber 27. A bracket 33 assists in supporting the coil 32. Coil 32 supports a brine tank 34 enclosing a removable drawer 35 having a handle 36. The drawer is divided into small pockets for receiving water to be frozen into cubes of ice. A detailed description of the apparatus contained in the chamber 27 is to be found in the copending application of Jesse G. King, Serial No. 642,366, filed May 30, 1923.

Refrigerating unit

Figure 6:
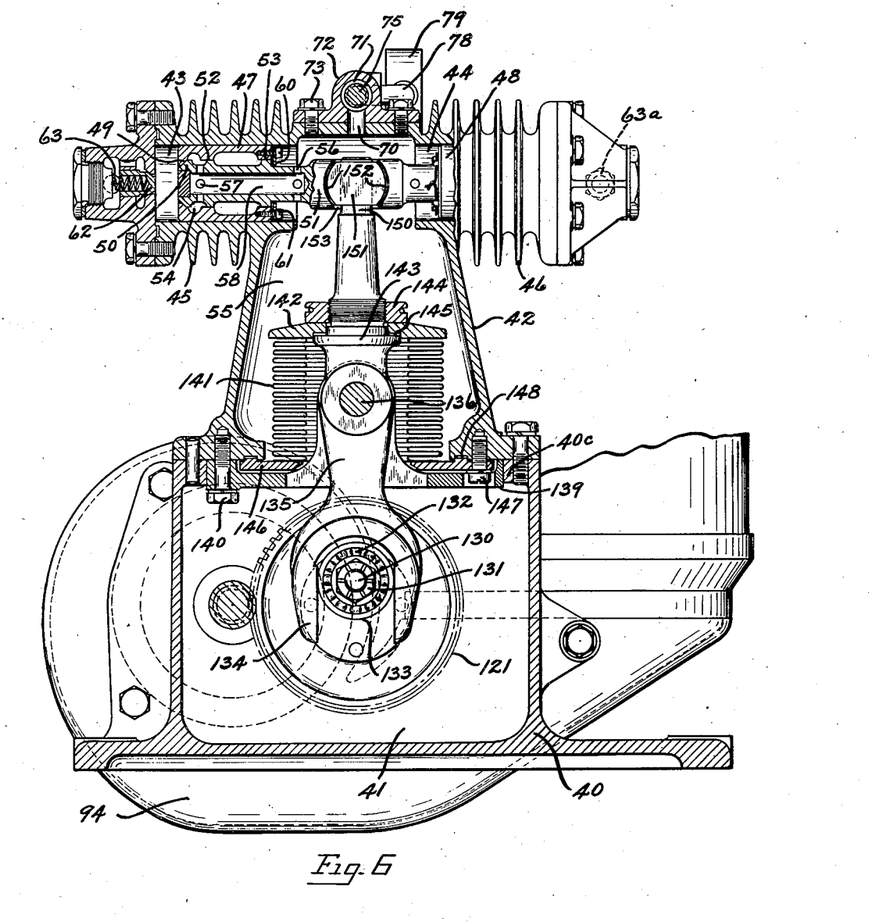
Fig. 6 is a sectional view on the line 6—6 of Fig. 5.

The unitary structure comprising the refrigerating mechanism which is connected with an expansion chamber 30 includes a main frame 40 supported by the shelf 22. The frame 40 includes end walls 40a and 40b and a top wall 40c enclosing a gear housing 41. Top wall 40c is apertured to permit parts of the operating mechanism to extend into the housing. The frame 40 supports a cylinder block 42 including horizontally disposed cylinders 43 and 44 provided with radiating fins 45 and 46. Pistons 47 and 48 reciprocate respectively in the cylinders 43 and 44. Each piston is provided with a valve seat 49 adapted to be engaged by valve 50 provided at each end of a connecting rod 51. Each piston is provided with inwardly extending annular flanges 52 and 53 for guiding a connecting rod 51. Between the flange 52 and the seat 49 there is provided an annular groove 54. Communication between the groove 54 and a refrigerant chamber 55 provided within the cylinder block 42 is provided by the transverse passages 56 and 57 and the longitudinally extending bore 58 provided at each end of the connecting rod 51. As shown in Fig. 6 the piston 47 is pushed to the left by the engagement of valve 50 with its seat 49 when the rod 51 moves to the left. When the rod 51 moves to the right it first engages a disc 60 surrounding the rod 51 and secured in position by means of screws 61. The heads of screws 61 are spaced from the inner end of the piston 47 so as to allow the disc 60 to be separated from the piston by a slight amount. When the connecting rod 51 moves to the right in Fig. 6 it will first move without moving the piston 47 until it has engaged the washer or disc 60 and disc 60 has engaged the heads of screws 61. At this instant the valve 50 will be moved away from its seat 49. Then both the valve and the piston will move to the right. Obviously the refrigerant fluid in chambers 55 can pass through the connecting rod and piston in the head end of cylinder 43. Then when the rod 51 is moved to the left the valve will first close, then the piston will move to the left to compress the refrigerant fluid and cause it to be forced out against the action of a spring pressed valve 62 and then out through an outlet opening 63. A counterpart of this opening is shown at 63a at the head end of cylinder 44. These outlets are connected by means of manifold pipes 64 and 64a, respectively, with a common pipe 65 which leads to condenser coils to be described.

The inlet for refrigerating gas into the compressor is provided at the top of the cylinder block 42 instead of through a side thereof as has been the custom. The top wall of block 42 is provided with an opening 70 in communication with a passage 71 in a valve block 72 of a shut off valve attached by screws 73 to the cylinder block 42. The valve block 72 carries a coupling 98, the inner end of which provides the valve seats 74 cooperating with a manually operable valve 75 having a squared end 76 for receiving a wrench after the cap 77 has been removed from the valve block 72. The passage 71 is connected by a pipe 78 with a pressure gage 79 so as to indicate the pressure in the cylinder block 42.

The compressed gas enters the condenser inlet manifold 80 from the pipe 65 and is distributed by the manifold to three concentrically arranged coils of condenser tubing 81, 82, and 83 which are all connected at their lower ends with the condenser outlet manifold 84 which is connected to the expansion chamber 30 in a manner to be described later. The coils 81, 82, and 83 are substantially the same lineal length so that there is no short circuiting of the refrigerant gas. The inlet manifold 80 is located at the top of the coils whereby the condensed refrigerant will drain to the bottom of the coils for exit through the manifold 84. The cooling air is delivered into the bottom of a draft tube 91 and issues from the top so that the portions of the coils containing condensed refrigerant will be in contact with the cooler circulating air. The manifold block 80 provides a valve seat 85 for receiving a manually operated shut off valve 86 having a screw driver slot 87 which can be turned after a cap 88 has been removed. The manifold block 80 is connected by pipe 89 with the pressure gauge 90 which indicates the pressure in condenser.

Figure 1:
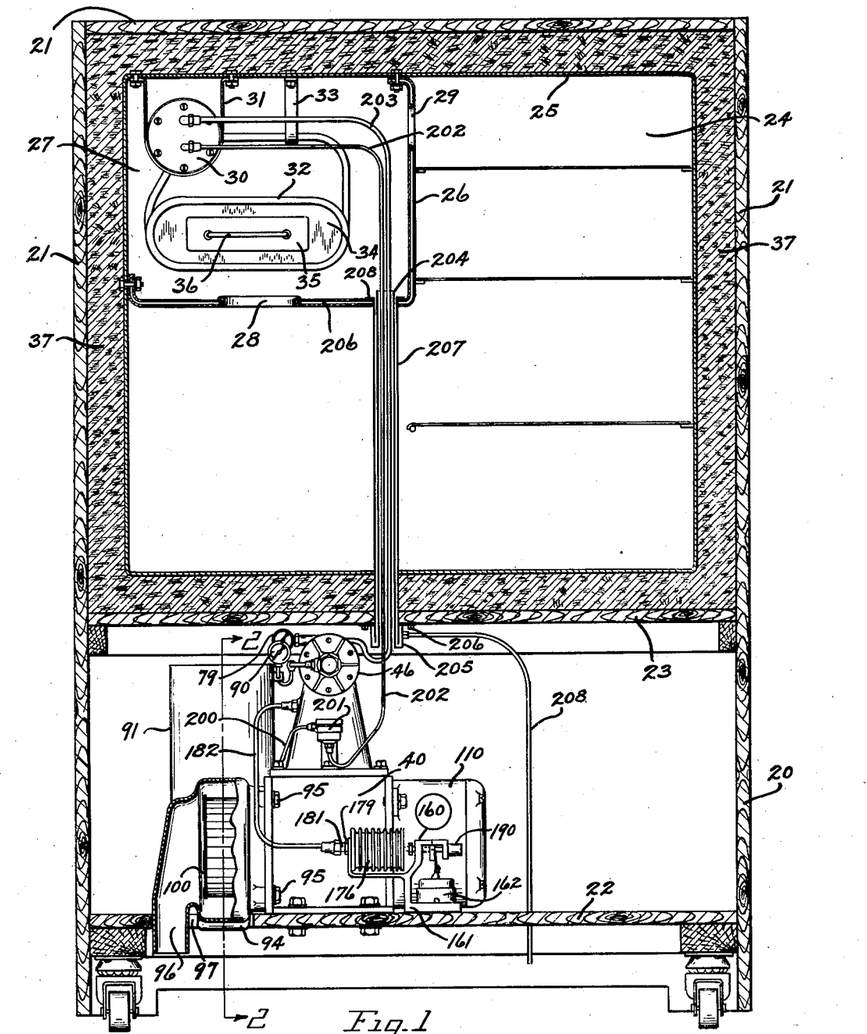
Fig. 1 is a sectional view of a refrigerator cabinet showing in elevation a refrigerating apparatus a part of which is broken away to show a part of the air cooling apparatus.

The condenser manifolds blocks 80 and 84 support the condenser coils 81, 82, and 83 and are supported by draft tube 91 which in turn is supported by a flange collar 92 supported by the snail 93 of a fan housing 94 which is attached by screws 95, (see Fig. 1) to the frame 40. The fan housing 95 includes a fan inlet 96 extending down through an aperture 97 in the shelf 22. Within the fan housing 94 there rotates a blower 100 of any suitable type of centrifugal blower which is mounted on hub 101 secured by nut 102 to the reduced end 103 of a shaft 104 journalled in bearings 105 and 106 carried by opposite end walls 40a and 40b of the frame 40.

The mechanism for operating the fan and the pump will now be described.

Figure 7:
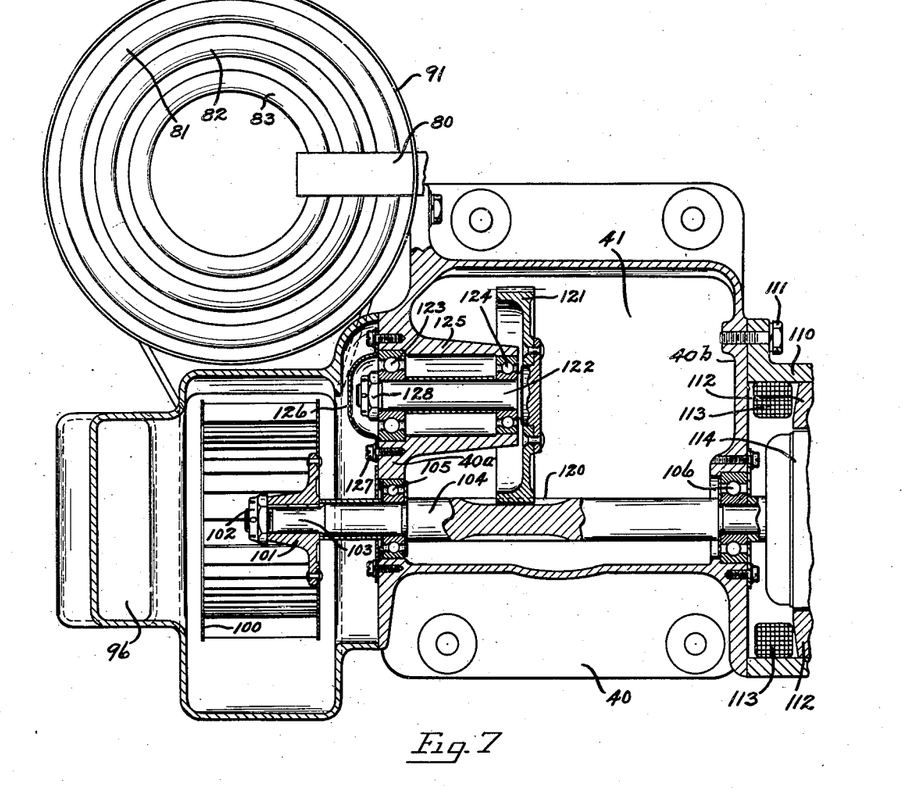
Fig. 7 is a sectional view on the line 7—7 of Fig. 5.
Figures 8, 9, 10:
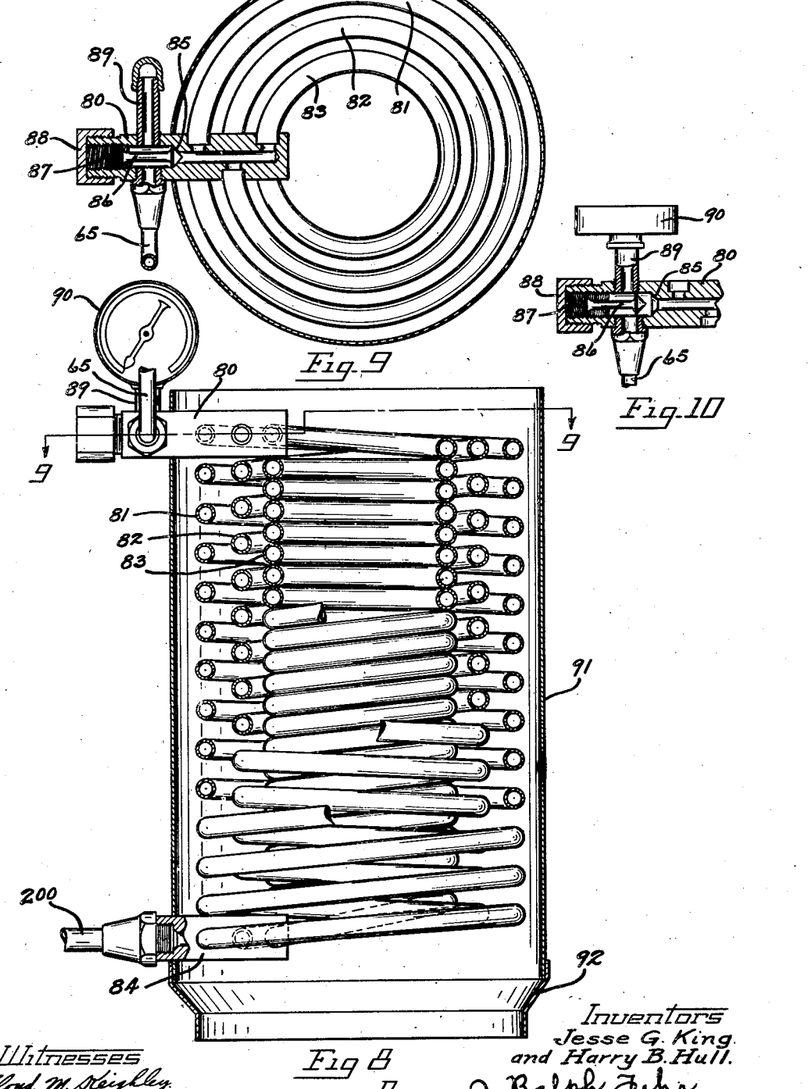
Fig. 8 is a sectional view on the line 8—8 of Fig. 2.
Fig. 9 is a sectional view on the line 9—9 of Fig. 8.
Fig. 10 is a sectional view of a valve shown in Fig. 9, the valve being open in Fig. 10.

The electric motor for driving the fan or pump unit includes the field frame 110 attached by screws 111 to the frame 40 and supporting pole pieces 112 and field magnet windings 113. The shaft 104 supports an armature 114 which overhangs the right of the end wall of frame 40 as viewed in Fig. 7.

The shaft 104 is provided with two bearings 105 and 106 and the left hand overhanging end of the shaft supports the fan while the right hand overhanging end suppports the armature. Both the fan and armature are removable endwise from the shaft 104.

The shaft 104 is provided intermediate its bearings 105 and 106 with gear teeth 120 meshing with a gear 121 attached to a crank shaft 122 journalled on bearings 123 and 124 supported by a hollow boss or flange 125 provided by the end wall 40a. The bearing 123 is retained in position by a cover plate 126 attached to wall 40a by screws 127. Removal of the cover plate 126 provides access to a nut 128, the removal of which will permit the shaft 122 to be withdrawn from its bearings.

The crank shaft 122 includes a crank pin 130 on which a nut 131 is threaded for retaining a ball bearing 132 in position, the outer race 133 of which is engaged by the forked end 134 of a rocking lever 135 which is mounted on a pin 136 supported on lugs 137 and 138 extending upwardly from a fulcrum plate 139 and spaced apart to receive the lever 135. The fulcrum plate 139 is secured to the cylinder block 42 by screws 140.

In order to seal the cylinder block 42 where the rocker lever 135 extends into it there is provided a flexible diaphragm or bellows 141 having its upper end permanently attached to washer 142 clamped against a shoulder 143 of lever 135 by a nut 144, there being a packing ring 145 between the washer 142 and the shoulder 143. The lower end of the bellows 141 is permanently secured to an apertured disc 146 attached by screws 147 to the cylinder block 42, there being a packing ring 148 between the disc 146 and the bottom of the block 42. The fulcrum pin 136 and the bellows 141 are so related that the lever 135 rocks about an axis midway between the ends of the bellows. In this way the bellows is not subjected to excessive side strain.

The upper end of the rocking bar 135 is provided with a cylindrical portion 150 which receives a block 151 having arcuate ends 152 adapted to be received by a notch 153 provided in the connecting rod 51, the ends of the notch 153 being curved to receive the arcuate surfaces of the block 151.

Through the train of gearing and rocking lever described the pump rod 51 will be reciprocated and the blower 100 will be revolved when the motor is operated.

Figure 2:
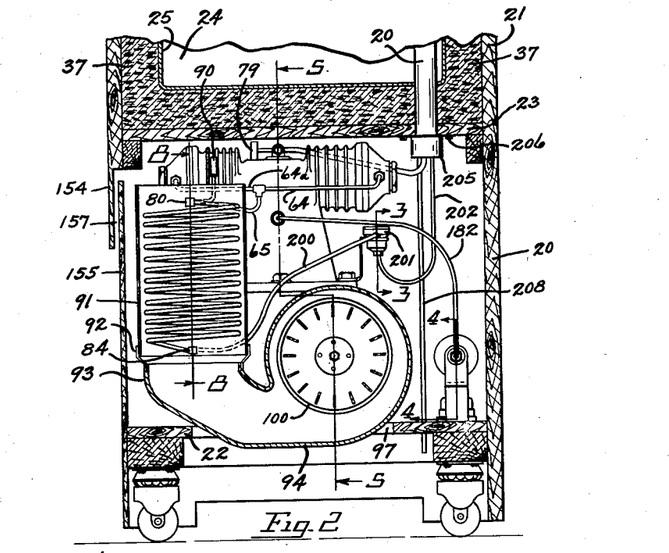
Fig. 2 is a sectional view on the line 2—2 of Fig. 1.

The back wall of the cabinet adjacent the machine compartment (see Fig. 2) is formed in two pieces or panels 154 and 155, which overlap and provide a passage 157 leading from the interior of the machine compartment. The cooling air for the condenser enters the fan inlet 96 from underneath the cabinet and is forced past the coils 81, 82, and 83. This air then passes into the machine compartment whence it passes through passage 157 in the back of the cabinet to the atmosphere. Air passing into the machine compartment also helps to cool the other mechanism contained therein. The panels 154 and 155 provide an outlet for the air from the cabinet in which settling dirt and dust cannot readily collect since the dirt will not readily pass upwardly through passage 157.

The present arrangement for the circulation of air for the condenser insures free circulation of air regardless where the refrigerator is installed. It may be placed in either one corner or another corner, or what may be termed right hand or left hand corners, of a room. The floor 22 of the machine compartment being spaced from the floor of the room, provides for the ready flow of air through the opening in the machine compartment floor. Therefore, if either of the side walls is placed in a corner, the flow of air to the condenser is not impaired. The air circulation is not impaired when the rear side of the cabinet is placed against a wall of the room. When the rear side is placed against the wall, the portion 154 will space the outlet passage 157 for air from the wall of the room and the air can escape sidewise. It is also apparent that if both of the opposite sides are placed against walls, the air flow is not impaired because the air can readily flow into the machine compartment and escape upwardly, after leaving the compartment, along the back of the refrigerator. Thus, by virtue of the described air circulating system, the compartments are arranged to provide a symmetrical and rectangular shaped cabinet, while the free circulation of air is insured regardless where the cabinet is positioned.

*Low pressure switch*

Figures 3, 4:
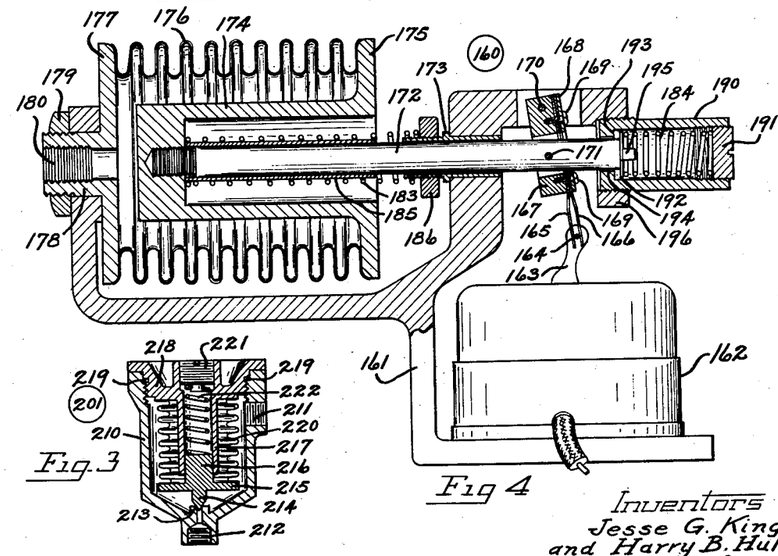
Fig. 3 is a sectional view on the line 3—3 of Fig. 2.
Fig. 4 is a sectional view of the low pressure switch on the line 4—4 of Fig. 2.
Figure 5:
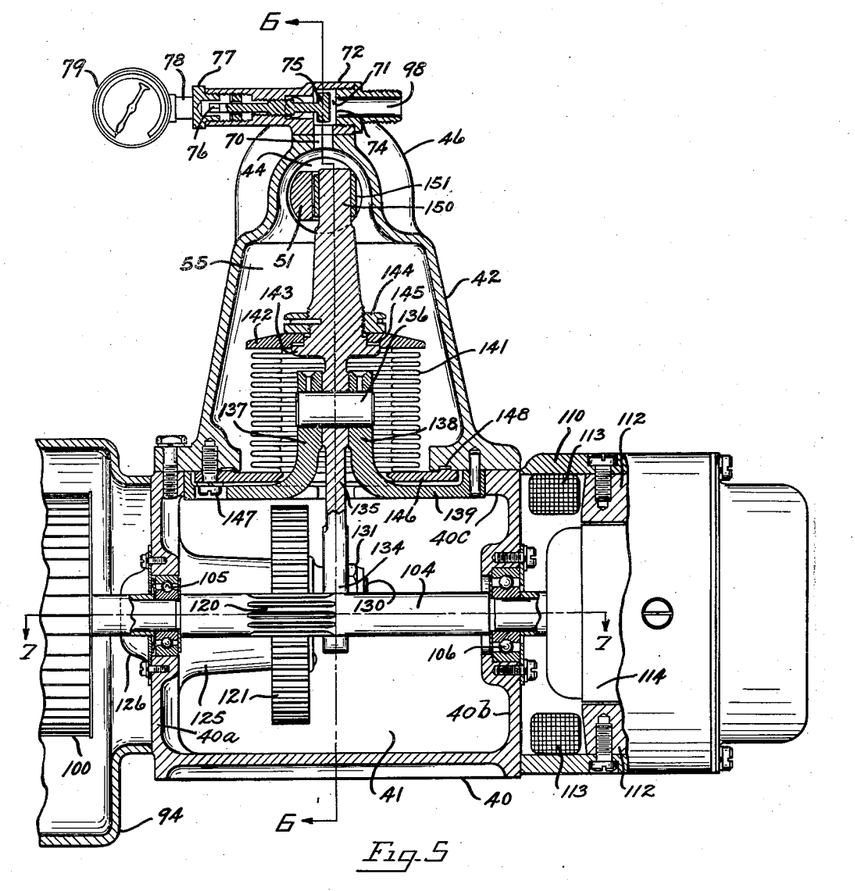
Fig. 5 is a sectional view on the line 5—5 of Fig. 2.

The motor is controlled by means of a low pressure switch which is shown partly in section in Fig. 4. This switch designated in its entirety by numeral 160 includes a bracket 161 supporting a snap switch 162 of the conventional type which includes an operating lever 163. In switches of this type the lever must be moved a certain distance before the contacts are actuated and the switch contacts are snapped quickly into engagement or out of engagement. As this switch is well known to those skilled in the art no further explanation is deemed necessary. The switch lever 163 carries a pin 164 engaged between spring members 165 and 166 clamped between a lever 167 and a plate 168 by means of screws 169. Lever 167 swings on pin 170 carried by bracket 161 and is connected by pin 171 with a rod 172 which slides through a bushing 173 carried by the bracket 161. The left end of rod 172 is threaded to receive a cup-shaped member 174 having a flange 175 to which is secured a flexible metal bellows 176 having its left end attached to a flange member 177 including a shank 178 located concentrically with the flange 175 and rod 172. The shank 178 projects through the bracket 161 and is externally threaded to receive a clamping nut 179 and internally bored and tapped at 180 to receive pipe connections 181 (see Fig. 1) for connecting the interior of the bellows 176 with the interior of the cylinder block 42 by means of a pipe 182.

The bellows 176 therefore expands according to the pressure within the gas chamber 55, and its expansion is resisted by two springs 183 and 184, the former being operating at all times and the latter coming into operation at certain times. The spring 183 surrounds the sleeve 185 surrounding the rod 172 and is interposed between the bottom wall of the cup-shaped member 174 and an adjusting nut 186 threaded onto the bushing 173. The spring 184 is received within a sleeve 190 and is interposed between a plug 191 threaded into the sleeve 190 and a washer 192 adapted to bear against the right hand end of rod 172 or against a shoulder 193 provided by the sleeve 190. The rod 172 projects through a hole 194 provided in sleeve 190 and is provided with a reduced end 195 projecting through the washer 192. The sleeve 190 is screwed into a lug 196 provided by bracket 161.

The operation of the switch 160 is as follows: In the position shown in Fig. 4 the switch lever 163 has been moved so that the switch contacts are closed and the motor is operating. For reasons to be described later the operation of the pump will cause the pressure in the chamber 55 to be gradually reduced, therefore the bellows 176 will contract due to the action of the springs 183 and 184 overcoming the pressure in the bellows. Both springs 184 and 183 will act together to move the rod 172 to the left as viewed in Fig. 4. Before the lever 163 is thrown into circuit opening position the spring 184 will have become inoperative because the washer 192, by striking the shoulder 193, will prevent any further expansion of the spring 184. Thereafter the rod 172 will be moved to the left by the spring 183 only. Finally the switch lever 163 will be moved into circuit opening positions and the motor will stop. While the motor is idle the liquefied refrigerant will be expanding in the expansion chamber 30 and pressure will be increasing in the chamber 55 therefore the bellows 176 will be expanding and this expansion will be resisted first by spring 183 only and then toward the end of the travel to the right of the rod 172 the expansion of the bellows will be resisted by both springs 183 and 184. This arrangement of springs provides a switch which may be operated at a predetermined pressure in the bellows independently of adjustment for the actuation of the switch in the opposite direction and vice versa. For instance, for ordinary operation, the switch cuts in at about ten pounds pressure and cuts out at about five pounds below atmospheric pressure. The spring 183 is adjusted by nut 186 so that the required pressure on the bellows is obtained, the spring 184 being inoperative because rod 172 has moved to such an extent that the washer 192 strikes the shoulder 193 and therefore it does not effect the cutting out of the switch. In this manner any degree of spring tension can be had for the cutting out of the switch independently of the spring 184. By adjusting the plug 191 the tension of spring 184 can be adjusted for varying tension thereof to adjust the cut in point of the switch. In this manner it is possible to regulate the switch so that the normal temperatures of the refrigerator can be regulated and also the cut in and cut out pressure can be regulated independently whereby the intervals and length of operation of the apparatus can be regulated.

*Condensation drain*

The condenser outlet manifold 84 is connected with the expansion tank 30 by means of a pipe 200, temperature responsive valve 201 and pipe 202. A refrigerant return pipe 203 connects the expansion tank 30 with the coupling 98 at the inlet to the pump chamber 55 the pipes 202 and 203 pass through a tube 204 which merges at its lower end into an annular cup 205 attached by screws 206 to the shelf 23. The tube 204 is enclosed by drain tube 207 flared over at 208 upon the upper surface of the partition 26, and extending at its lower end down into the cup 205 which is partly filled with condensed water vapor which may overflow through the pipe 208. Water is maintained in the cup 205 to the level determined by pipe 208. This level is sufficient to seal the lower end of tube 207 so that noxious air, which may enter the drain pipe 208, cannot enter the cabinet.

*Temperature responsive valve*

The temperature responsive valve designated as a whole by 201 includes a body 210 having an inlet 211 connected with pipe 200 and outlet 202. The body 210 provides a seat 213 for a valve 214 extending down from a flange 215 having a shank 216 slidable within a sleeve 217 extending down from a cover 218 screwed into a body 210; packing 219 is placed between the body and cover to make a seal. A flexible bellows 220 is permanently attached to the flange 215 and to cover 218. A plug 221 is screwed into threaded opening communicating with the interior of the hollow sleeve 217. A spring 222 is interposed between the plug 221 and the upper end of shank 216. By removing the plug 221 the bellows 220 can be partly filled with temperature responsive volatile liquid such as ether or methyl chloride. The plug 221 is used to seal the entrance to the interior of the bellows and to provide an adjustment of the spring 222.

*Operation of the refrigerating plant*

The refrigerant fluid contained in the system such as sulphur dioxide will be somewhat in a gaseous state within the pump chamber and above a certain level in the expansion chamber. This level depending on operation conditions. Assuming that the pressure of the gas in the pump chamber 55 is such as to close the switch 162, the motor will operate the pump and fan and the refrigerant will be compressed and forced into the condenser wherein it will become liquefied by reducing the temperature by virtue of the air-cooling apparatus. The liquefied refrigerant will then pass through the automatic valve 201, and when the body 210 is partly filled with liquid refrigerant, the liquid within the bellows 220 will be reduced in temperature and the bellows will contract thereby opening the valve 214. Then the refrigerant will pass from the valve 201 through the pipe 202 to the expansion chamber. The refrigerant will be conducted through the coil 32 and will absorb heat from the surrounding atmosphere causing it to become vaporized. These vapors will collect above the level of the liquid in the tank 30 and will return through the pipe 203 to the pump chamber 55.

A certain amount of lubricant is placed in the refrigerant system for lubricating the cylinder walls and piston. The inlet of refrigerant to the compressor is located above rocking bar 135 and the oil in the refrigerant can drop directly upon the block 151 and notch 153 for lubricating the contacting surfaces thereof.

While the form of mechanism herein shown and described constitutes a preferred embodiment of one form of invention, it is to be understood that other forms might be adopted and various changes and alterations made in the shape, size, and proportion of the elements therein without departing from the spirit and scope of the invention.

What is claimed is as follows:

1. In refrigerating apparatus, a unitary structure comprising in combination a frame having end walls, a compressor supported by the frame, a draft tube attached to one end wall, a condenser located in the draft tube and supported by the frame and connected with the high-pressure side of the compressor, a motor mounted on the opposite end wall, a rotatable blower located in the draft tube, and means extending through the frame for connecting the motor and blower.

2. In refrigerating apparatus, a unitary structure comprising in combination a frame having end walls, a compressor supported by the frame, a draft tube attached to one end wall, a condenser located in the draft tube and supported by the frame and connected with the high-pressure side of the compressor, a motor mounted on the opposite end wall, a rotatable blower located in the draft tube, and a shaft extending through the frame and rotatably supporting the blower and motor armature.

3. In refrigerating apparatus, a unitary structure comprising in combination, a shaft, a frame rotatably supporting the shaft intermediate its ends, a compressor supported by the frame, a blower mounted on one end of said shaft, a motor armature mounted on the other end of the shaft, a condenser connected with the high-pressure side of the compressor, a draft tube, said draft tube and condenser cooperating with the blower, and a motor field cooperating with said armature.

4. In refrigerating apparatus, a unitary structure comprising in combination, a shaft, a frame rotatably supporting the shaft intermediate its ends, a compressor supported by the frame a condenser connected with the high-pressure side of the compressor, means for cooling the condenser including a movable member connected with one end of said shaft, a motor armature mounted on the other end of the shaft, and a motor field cooperating with said armature.

5. In a refrigerating apparatus, a unitary structure comprising, in combination, a shaft, a transmission housing rotatably supporting the shaft intermediate is ends, a compressor supported by the housing, transmission mechanism within the housing for connecting the compressor with the shaft, a blower mounted on one end of said shaft, a motor armature mounted on the other end of the shaft, a condenser connected with the high-pressure side of the compressor and arranged to be cooled by said blower, and a motor field cooperating with the armature and carried by the housing.

6. In a refrigerating apparatus, the combination with a cabinet having a food chamber and a cooling chamber in an upper portion thereof; of an expansion tank located in the cooling chamber; a mechanism for compressing and condensing located below the food chamber; pipes connecting the mechanism with the tank and extending through the food compartment; and means tending to insulate the pipes from the food chamber and for collecting condensed moisture and delivering said condensation to a drain, and including provisions for preventing drain odors being conducted into the food chamber.

7. In a refrigerating apparatus, the combination with a cabinet having a cooling chamber, a cooling unit located in the cooling chamber, mechanism for withdrawing refrigerant from the unit and for condensing said refrigerant and for forcing the same into the unit, a pipe connecting the unit with said mechanism, and a drain for the cooling chamber extending through a wall of the cabinet and surrounding said pipe, said drain including provisions for preventing drain odors being conducted into the cabinet.

8. In a refrigerating apparatus, the combination with a cabinet having a cooling chamber, a cooling unit located in the cooling chamber, mechanism for withdrawing refrigerant from the unit and for condensing said refrigerant and for forcing the same into the unit, a pipe connecting said unit with said mechanism, and a drain for the cooling chamber extending through a wall of the cabinet and surrounding said pipe and including a moisture-receiving receptacle, said receptacle having a drain outlet and having an inner tubular wall extending above said drain outlet and surrounding said pipe.

9. In a refrigerating apparatus, the combination with a cooling unit, refrigerant circulating means operatively connected with said unit and including a condenser, a cabinet for enclosing said circulating means and condenser, said cabinet having an opening in the bottom wall thereof and an opening in a side wall thereof, and air-circulating means for cooling the condenser including a conduit containing the condenser and having its inlet extending into the opening in the bottom wall of the cabinet and its outlet within the cabinet the opening in the side wall of the cabinet providing for the egress of air from the cabinet.

10. In a refrigerating apparatus, the combination with a cooling unit; refrigerant circulating means operatively connected with said unit and including a condenser, a cabinet for enclosing said circulating means, said cabinet having an opening in the bottom wall thereof and an opening in a side wall thereof, and air-circulating means for cooling the condenser including a conduit containing the condenser and having its inlet extending into the opening in the bottom wall of the cabinet and its outlet within the cabinet adjacent the opening in the side wall.

11. In a refrigerating apparatus, the combination of a cooling unit, refrigerant circulating means operatively connected with said unit, including a condenser, a cabinet for enclosing said refrigerant circulating means, air-circulating means for cooling the condenser, said cabinet having air inlet and outlet openings associated with said means, one of said openings being formed by a side of the cabinet, said side including overlapping panels spaced from one another with the inner panel extending above the outer panel.

12. In a refrigerating apparatus, a unitary structure comprising in combination a transmission housing, a compressor supported by said housing, a motor carried by a wall of said housing, a fan carried by an opposite wall of said housing and transmission mechanism between said motor said compressor and said fan, a condenser connected with the high pressure side of the compressor and arranged to be cooled by said fan.

13. In a refrigerating apparatus, a unitary structure comprising in combination a transmission housing, a motor carried by a wall of said housing, a fan, a compressor and transmission mechanism within said housing operatively connecting said motor, said compressor and said fan, a condenser connected with the high pressure side of the compressor and arranged to be cooled by said fan.

In testimony whereof we hereto affix our signatures.

JESSE G. KING.
HARRY B. HULL.